United States Patent [19]

Janes

[11] Patent Number: 5,687,560
[45] Date of Patent: *Nov. 18, 1997

[54] STEAM RAISING APPARATUS FOR PERFORMANCE ENHANCED GAS TURBINE POWERPLANTS

[75] Inventor: Clarence W. Janes, Sacramento, Calif.

[73] Assignee: California Energy Commission, Sacramento, Calif.

[*] Notice: The term of this patent shall not extend beyond the expiration date of Pat. No. 5,490,377.

[21] Appl. No.: 480,674

[22] Filed: Jun. 7, 1995

Related U.S. Application Data

[63] Continuation-in-part of Ser. No. 182,661, Jan. 12, 1994, Pat. No. 5,490,377, which is a continuation-in-part of Ser. No. 139,525, Oct. 19, 1993, abandoned.

[51] Int. Cl.$^6$ ............................................. F02C 3/30
[52] U.S. Cl. ................................. 60/39.58; 60/736
[58] Field of Search ....................... 60/39.12, 39.182, 60/39.465, 39.511, 39.58, 39.59, 736

[56] References Cited

U.S. PATENT DOCUMENTS

| | | |
|---|---|---|
| 2,625,012 | 1/1953 | Larrecq . |
| 2,633,707 | 4/1953 | Hermitte et al. . |
| 3,166,902 | 1/1965 | Maljanian et al. . |
| 3,785,145 | 1/1974 | Amann . |
| 3,949,548 | 4/1976 | Lockwood . |
| 3,969,892 | 7/1976 | Stettler . |
| 4,182,127 | 1/1980 | Johnson . |
| 4,765,142 | 8/1988 | Hakhamkin . |
| 4,858,428 | 8/1989 | Paul . |
| 4,872,307 | 10/1989 | Nakhamkin . |
| 4,885,912 | 12/1989 | Nakhamkin . |
| 5,095,693 | 3/1992 | Day . |
| 5,133,180 | 7/1992 | Horner . |
| 5,161,365 | 11/1992 | Wright . |
| 5,313,790 | 5/1994 | Barr . |
| 5,347,806 | 9/1994 | Nakhamkin . |
| 5,490,377 | 2/1996 | Janes ................................. 60/39.12 |

FOREIGN PATENT DOCUMENTS

| | | |
|---|---|---|
| 0150990 | 8/1985 | European Pat. Off. . |
| 15917 | 2/1977 | Japan . |
| 60-93132 | 5/1985 | Japan . |
| 851940 | 10/1960 | United Kingdom . |
| 2227796 | 8/1990 | United Kingdom . |
| 2232721 | 12/1990 | United Kingdom . |
| 2264539 | 9/1993 | United Kingdom . |

OTHER PUBLICATIONS

The HAT Cycle; Electric Power Research Institute; undated.
"Increasing gas turbine efficiency through the use of a waste heat methanol reactor"; Janes, C.W. 1979, Amer. Chem. Society.
"Developments to watch, the next generation of powerplants"; Makansi, J.; Jun. 1990; Power Magazine—vol. 34, No. 6.
CEC; "Chemically Recuperated Gas Turbine . . . and Reheat" (1992) Gas Turbine World, p. 37.

*Primary Examiner*—Louis J. Casaregola
*Attorney, Agent, or Firm*—John P. O'Banion

[57] ABSTRACT

A steam raising apparatus for a gas turbine driven powerplant in which fuel and water are introduced into a heat exchanger at multiple pressures and steam/fuel mixtures are removed from the heat exchanger at multiple pressures, some of which are above the desired pressure for combustion and some of which are below. The higher pressure flows are reduced in pressure by using them to drive a steam turbine coupled to a steam compressor, and the lower pressure flows are increased in pressure by means of the compressor. The resultant flows are then be combined into a single flow at the required pressure and routed to the combustor. Alternatively, multiple steam jet ejectors forming a thermocompressor assembly are used instead of the steam turbine/steam compressor assembly.

5 Claims, 4 Drawing Sheets

STEAM RAISING APPARATUS FOR PERFORMANCE ENHANCED GAS TURBINE POWERPLANTS

CROSS-REFERENCE TO RELATED APPLICATIONS

This application is a continuation-in-part of application Ser. No. 08/182,661 filed on Jan. 12, 1994 (U.S. Pat. No. 5,490,377), which is a continuation-in-part of application Ser. No. 08/139,525 filed on Oct. 19, 1993 (abandoned).

BACKGROUND OF THE INVENTION

1. Field of the Invention

This invention pertains generally to gas turbine driven powerplants, and more particularly to a gas turbine driven powerplant in which steam is raised and injected as part of a fuel mixture in order to increase mass flow through the power generating turbine.

2. Description of the Background Art

In gas turbine driven powerplants the recovery, recycle, and conversion of heat remaining in the exhaust stream has been used to increase overall powerplant performance. The high temperature turbine exhaust heat is normally recovered by conventional steam raising techniques or, in older low pressure gas turbine powerplants, by a regenerator (plate-fin air-to-gas heat exchanger) employing a counter current flow of lower temperature compressor discharge air against the flow of higher temperature turbine exhaust gas. The ever increasing compressor discharge air temperature of the newer gas turbines, however, limits the heat recovery effectiveness of such regenerators. In gas turbines derived from advanced aircraft engines, the compressor discharge temperatures are 200 to 300 degrees Fahrenheit greater than turbine exhaust temperature, thereby ruling out use of a regenerator altogether. In the high pressure turbine engine driven powerplant, steam is raised in a conventional boiler to extract exhaust heat, routed to a condensing steam turbine with condensate recycled to the boiler. This combination of a gas turbine and steam turbine bottoming cycle is referred to as a combined cycle powerplant.

Alternatively, heat recuperating steam raised in the boiler from the turbine exhaust heat is simply injected into the gas turbine flow path before the combustor for power augmentation. The gas turbine engine's increasingly higher firing temperatures and compression ratios thermodynamically favor the steam injection option over the steam bottoming cycle. Additionally, direct steam injection into the gas turbine combustor obviates the need for purchase and operation of a condensing steam turbine, condenser, cooling tower, and interconnecting circulating water piping. Elimination of the steam bottoming cycle and its associated equipment increases overall plant durability, reliability, availability, and maintainability.

As firing temperatures are increased in advanced gas turbine engines, they produce nitrogen oxides, $NO_x$, at exponentially increasing rates. Controlling emissions at the combustor to ever more stringent air quality emission limitations is a major combustor development problem. Peak temperatures in the combustor occur at the flame front where fuel and air react. Dilution of the fuel prior to combustion limits the flame temperatures. Fuel dilution can be effected with air, steam, or any noncombustible gas. Steam or water injection, in addition to achieving the aforementioned power augmentation, has long been used to reduce $NO_x$ formation in the combustor. Dilution can be accomplished in the combustor, but is more effective if accomplished in the fuel stream alone prior to injection into the combustor due to improved mixing. Fuel dilution with air as the diluent is currently being accomplished in specially designed premix "dry low $NO_x$" or "dry low emission" combustors. However, with natural gas, or with liquid fuels, combustibility problems limit the amount of fuel dilution that can be accomplished before combustor flame out occurs. Several of the gas turbine manufacturers warranties are invalid if operated at fuel dilution levels of greater than two pounds of steam per pound of fuel. The $NO_x$ concentration at this flameout dilution is still many times greater than is legal to operate in California and other jurisdictions. Carbon monoxide, formaldehyde, and other unburned products also increase greatly with steam usage as combustion becomes more incomplete. $NO_x$ can be further reduced in the exhaust gas flow by injecting ammonia, together with placement of a suitable catalyst. Carbon monoxide in the exhaust gas can also be catalytically oxidized with a suitable catalyst. Emission control by means of selective catalytic reduction (SCR) with ammonia is a significant cost and liability risk as ammonia is expensive, a hazardous toxic material, and handling presents an on-going safety problem. With all of the acknowledged drawbacks SCR is (without a better option) deemed the "Best Available Control Technology" (BACT) and is legally mandated in some jurisdictions.

Two additional, long-recognized, design techniques for enhancing gas turbine engine performance are intercooled compression and a reheat combustor firing before the power turbine. Intercooling, while enhancing performance, also results in increased design complexity and expense for development work. Reheat, while increasing power output, also raises temperatures throughout the power turbine, requiring a major bleed of cooling air significantly reducing the net efficiency gains. However, conventional reheat development costs may exceed those for intercooling.

Therefore, there is a need for a high efficiency gas turbine driven powerplant which produces low $NO_x$ emissions at higher firing temperatures. The present invention satisfies that and other needs as described herein, and overcomes the deficiencies in conventional designs.

SUMMARY OF THE INVENTION

In my co-pending applications referenced above, I showed how a hot-air-to-fuel heat exchanger could be used to simultaneously cool a stream of highly compressed air and heat a mixture of water and combustible effluent. The resultant cooled compressed air could then be made available for use as a superior coolant in cooling turbine hot sections and as a heat sink for returning to the cycle exhaust heat or otherwise unrecoverable heat from auxiliary operations. Further, I showed how the injection of a two-phased feed of water and combustible into the heat exchanger could (i) increase the efficiency of the heat exchange, and (ii) provide for a greater amount of the heat in the compressed air to be transferred to the water and combustible. The water and combustible would then rapidly become a steam/fuel mixture ready for injection into the combustor and also ready for catalytic reforming to produce a hydrogen rich, low $NO_x$ fuel for injection into the combustor. I also explained that, in order to achieve more heat transfer and a cooler stream of compressed air, steam can be raised at varying pressures and then recombined in an apparatus designed to solve the problem that some of these pressures will be insufficient to enter the combustor of the gas turbine driven engine.

The present invention generally pertains to a refinement of the solution to the above problem presented in my copending application. There, it was shown that the steam/fuel mixture could be removed at multiple pressures in the heat exchanger, some of which are above the desired pressure and some of which are below. The higher pressure flows would be reduced in pressure by using them to drive a steam turbine coupled to a steam compressor, and the lower pressure flows would be increased in pressure by means of the compressor. The resultant flows would then be combined into a single flow at the required pressure and routed to the combustor.

In accordance with one aspect of the invention, the steam turbine/steam compressor assembly described above is coupled to a heat exchanger which is placed in the compressed air stream as described above, in the exhaust stream or in another location where a flow of heat is available. In accordance with another aspect of the invention, a thermocompressor array comprising steam jet ejectors is used instead of the steam turbine/steam compressor assembly. By employing the invention, performance of steam injected gas turbine cycles can be enhanced whether a two-phased feed of water and combustible is used, or whether steam is raised without taking advantage of the thermodynamic benefits of the two-phased feed.

An object of the invention is to raise steam in a gas turbine driven powerplant.

Another object of the invention is to provide a combustible effluent in a gas turbine driven powerplant at the proper combustion pressure.

Another object of the invention is to raise steam a multiple pressures and equalize those pressures for delivery to a combustor in a gas turbine driven powerplant.

Another object of the invention of the invention is to recover as much heat as is practically possible from the air stream for each pound of water used so as to reduce the amount of water used for heat recover, thus also reducing the latent heat eventually lost in the stack.

Another object of the invention is to provide a steam/fuel mixture at sufficient pressure and temperature to allow it to be readily processed into a low $NO_x$ fuel.

A further object of the invention is to take advantage of the thermodynamic efficiency of a two phased feed of water and combustible to recuperate heat that otherwise could be lost to the cycle.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
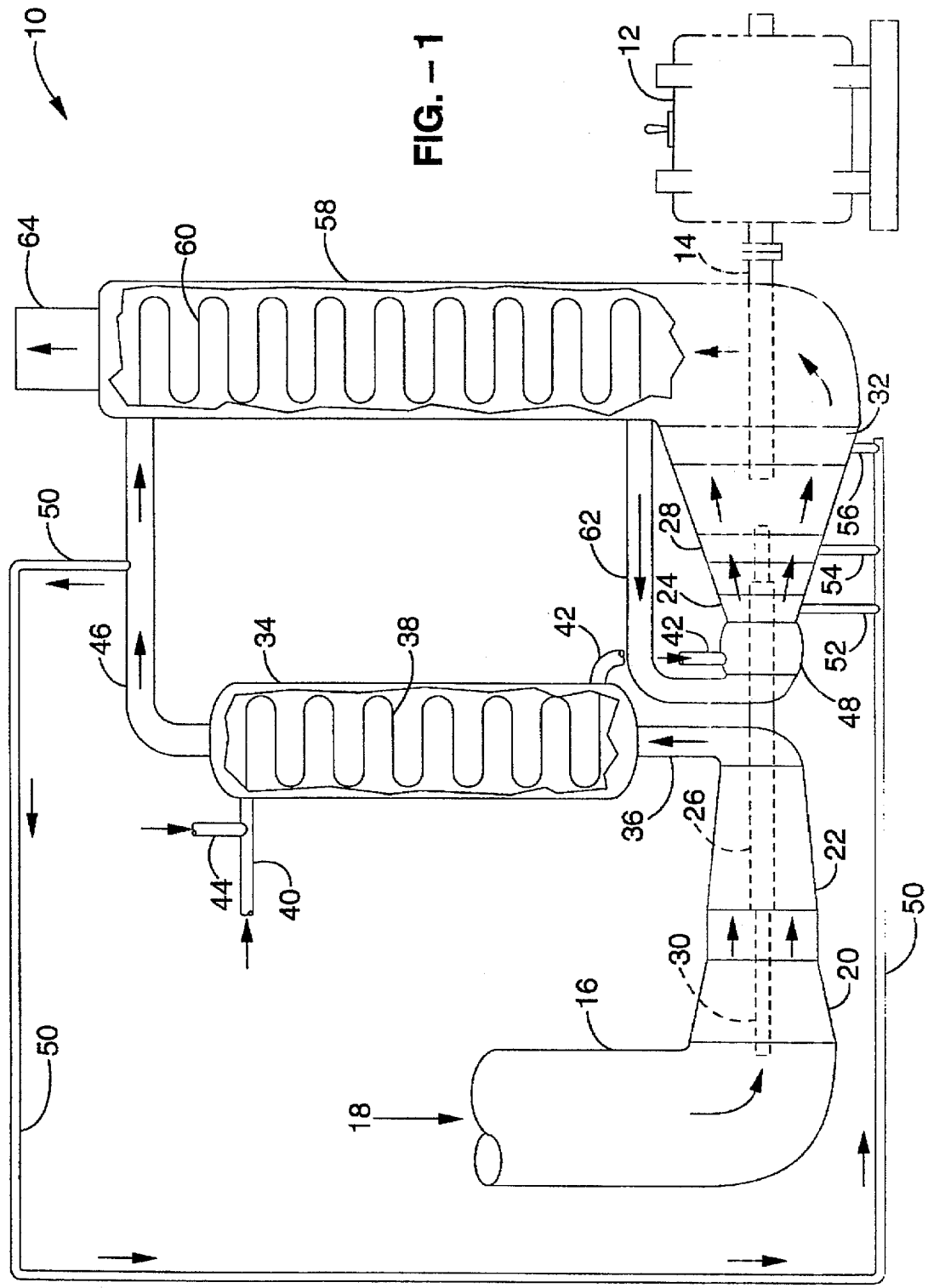
FIG. 1 is a schematic diagram of a gas turbine driven power plant in accordance with the present invention showing a heat exchanger down stream of the compressor and a regenerator downstream of the heat exchanger.

Referring more specifically to the drawings, for illustrative purposes the present invention is embodied in the apparatus schematically shown in FIG. 1 through FIG. 4 where like reference numerals correspond to like elements. It will be appreciated that the apparatus may vary as to configuration and as to details of the parts without departing from the basic concepts as disclosed herein.

Referring first to FIG. 1, a gas turbine driven powerplant 10 is shown coupled to a load 12 such as an electrical generator or the like by a shaft 14. Powerplant 10 typically includes a compressor inlet 16 for receiving filtered air 18 for compression. A low pressure compressor 20 is positioned downstream of air inlet 16, and a high pressure compressor 22 is positioned downstream of low pressure compressor 20 for producing a high pressure, high temperature downstream flow. A high pressure turbine 24 is mechanically coupled to high pressure compressor 22 by a shaft 26, and a low pressure turbine 28 is positioned downstream of high pressure turbine 24 and mechanically coupled to low pressure compressor 20 by a shaft 30. An aerodynamically coupled power turbine 32 is positioned downstream of low pressure turbine 24 and coupled to shaft 14. The compressors and turbines employed may be of conventional aircraft design, or of other types typically used in gas turbine driven powerplants. Those skilled in the art will appreciate that additional compressors and turbines may be utilized, and that if the speed of the low pressure turbine is compatible with the generation of power of the desired type of alternating current (e.g. 3600 RPM for generation of power at 60 cycles per second), then the low pressure turbine may act as the power turbine as well as the driver for the low pressure compressor.

A heat exchanger 34 is positioned downstream of high pressure compressor 22 and coupled to the output of high pressure compressor 22 by an air input duct 36. Heat exchanger 34 can be a conventional once through counter-current heat exchanger or the like or, if desired, a conventional catalytic methane/steam reformer. Heat exchanger 34 includes fuel carrying coils 38 which are coupled to a fuel inlet 40 and a fuel outlet 42. A water inlet 44 is also provided for mixing water with the input fuel, and an air output duct 46 is provided for routing the air which flows across coils 38 and exits heat exchanger 34.

When air is compressed, it is heated. Depending on whether or not intercooling between compressors is employed, the temperature of the air exiting the high pressure compressor (which can be at 40 to 50 atmospheres of pressure) may reach temperatures as high as 1100 to 1200 degrees Fahrenheit. As the high temperature compressed air passes over coils 38, heat is transferred to the fuel and water mixture flowing through coils 38. The highly compressed air is cooled to a close approach to the temperature of the fuel/water mixture feed to coils 38 as the heat from the air is transferred to this fuel/water mixture. Typically the fuel temperature will rise to a temperature which is approximately 20 to 50 degrees Fahrenheit lower than the temperature of the air discharged from high pressure compressor 22. The high temperature fuel flows through fuel outlet 42 and into the fuel inlet of combustor 48 where it is burned. Alternatively, the fuel can be further processed to a hydrogen-rich fuel gas before burning.

The cooled compressed air which exits heat exchanger 34 is divided into two streams. The first stream is a side stream which flows through coolant line 50 to provide air for cooling hot metal components in the compressors and turbines. For example, as shown in FIG. 1, the cool air is divided and flows through high pressure turbine coolant line 52, low pressure turbine coolant line 54, and power turbine coolant line 56, respectively. This low temperature air serves as an excellent coolant for the compressor and turbine blades and vanes, thereby permitting use of high combustion temperatures as compared to conventional gas turbine driven powerplants. In conventional powerplants, cooling is typically effected using the high temperature air discharged from the high pressure compressor. Therefore, in the present invention, the coolant temperature can be as much as approximately 1000 degrees Fahrenheit lower than in conventional gas turbine powerplants.

The remaining cooled compressed air feeds a conventional regenerator (plate-fin recuperator) 58 which is positioned downstream of heat exchanger 34 and coolant line 50. The cooled air flows through air carrying coils 60 and is routed through an air duct 62 which feeds combustor 48. Exhaust gas exiting power turbine 32 through the exhaust ducting flows across coils 60 and through regenerator 58, and then courses out an exhaust stack 64. The heat from the exhaust gas passing over coils 60 is thereby transferred to and heats the air flowing through coils 60. The air is heated to a temperature approaching the temperature of the exhaust gas and is suitable for use as combustion air for combustor 48. Therefore, not only is the cooled air reheated for use as combustion air, but the exhaust gases are cooled before they exit exhaust stack 64.

As indicated before, heat exchanger 34 may be a conventional hot-air-to-fuel heat exchanger or, preferably, a conventional catalytic methane/steam reformer. Since the temperature of the air discharged from high pressure compressor 22 will be on the order of 1100 to 1200 degrees Fahrenheit, it is suitable for use in the production of reformed fuel. The reformer catalyst would preferably be one which reacts with a hydrocarbon fuel such as natural gas or naphtha. Since conventional reformers utilize a nickel-based catalyst which can be poisoned by sulphur, the fuel used should be desulphurized or have an extremely low sulphur content. Additionally, the water should be purified to standards equivalent to those where water is used in a supercritical steam driven powerplant. The water is heated to steam and reacts endothermically with the fuel on the catalyst to produce a hydrogen-rich combustible effluent. The hydrogen-rich combustible effluent from the methane/steam reformer is then used to fuel the combustor which produces low $NO_x$ combustion products.

Figure 2:
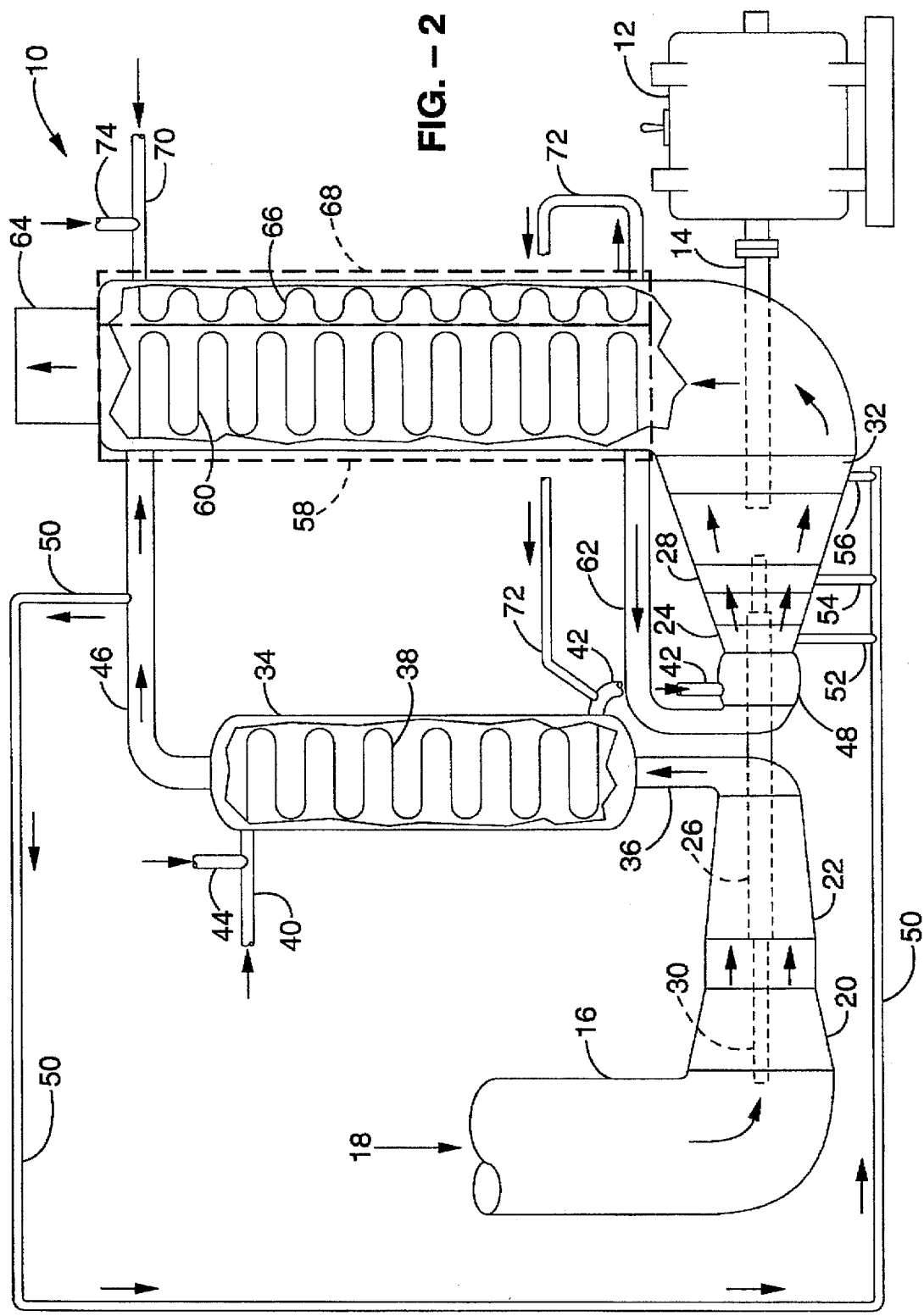
FIG. 2 is a schematic diagram of alternative embodiment of the gas turbine driven powerplant shown in FIG. 1.

Referring now to FIG. 2, an alternative embodiment of powerplant 10 is shown in which heat exchanger 34 is a first methane/steam reformer. In this embodiment, the exhaust gas flow from power turbine 32 is divided between the regenerator 58 and the fuel carrying coils 66 of a second methane/steam reformer 68, respectively. Through mechanical design of the regenerator 58 (given expected pressures and volumes of exhaust stream gas and cooled compressed air from the first methane/steam reformer 34), enough of the power turbine exhaust gas stream heat will be directed through the regenerator 58 to simultaneously bring the cooled compressed air flow from the first methane/steam reformer 34 up to a close approach ("pinch point") to the temperature of the exhaust gas stream while bringing the temperature of the exhaust gas stream down to a close approach to the temperature of the cooled compressed air exiting the methane/steam reformer 34. The remaining heat contained in the power turbine exhaust gas stream is available for use in the second methane/steam reformer 68 which is designed to extract enough of that heat to cool this second portion of the exhaust gas stream to approximately the same pressure and temperature as the portion of the exhaust gas stream exiting the regenerator 58. This division of exhaust gas flow into two parallel flows will yield a thermodynamically matched heat exchange regenerator.

Coils 66 of second methane/steam reformer 68 are coupled to a fuel inlet 70 and a fuel outlet 72. A water inlet 74 is also provided for mixing water with the input fuel. Fuel outlet 72 is coupled to fuel outlet 42 (or the fuel inlet of combustor 48) so that the hydrogen-rich combustible effluent from the second methane/steam reformer 68 combines with the hydrogen-rich combustible effluent from the first methane/steam reformer 34 to fuel combustor 48. In addition, the two cooled, parallel flowing, exhaust gas streams exiting the regenerator 58 and second methane/steam reformer 68 rejoin and course out exhaust stack 64.

Those skilled in the art will appreciate that a conventional hot-air-to-fuel heat exchanger could be substituted for either first methane/steam reformer 34 or second methane/steam reformer 68, or both, if desired.

Figure 3:
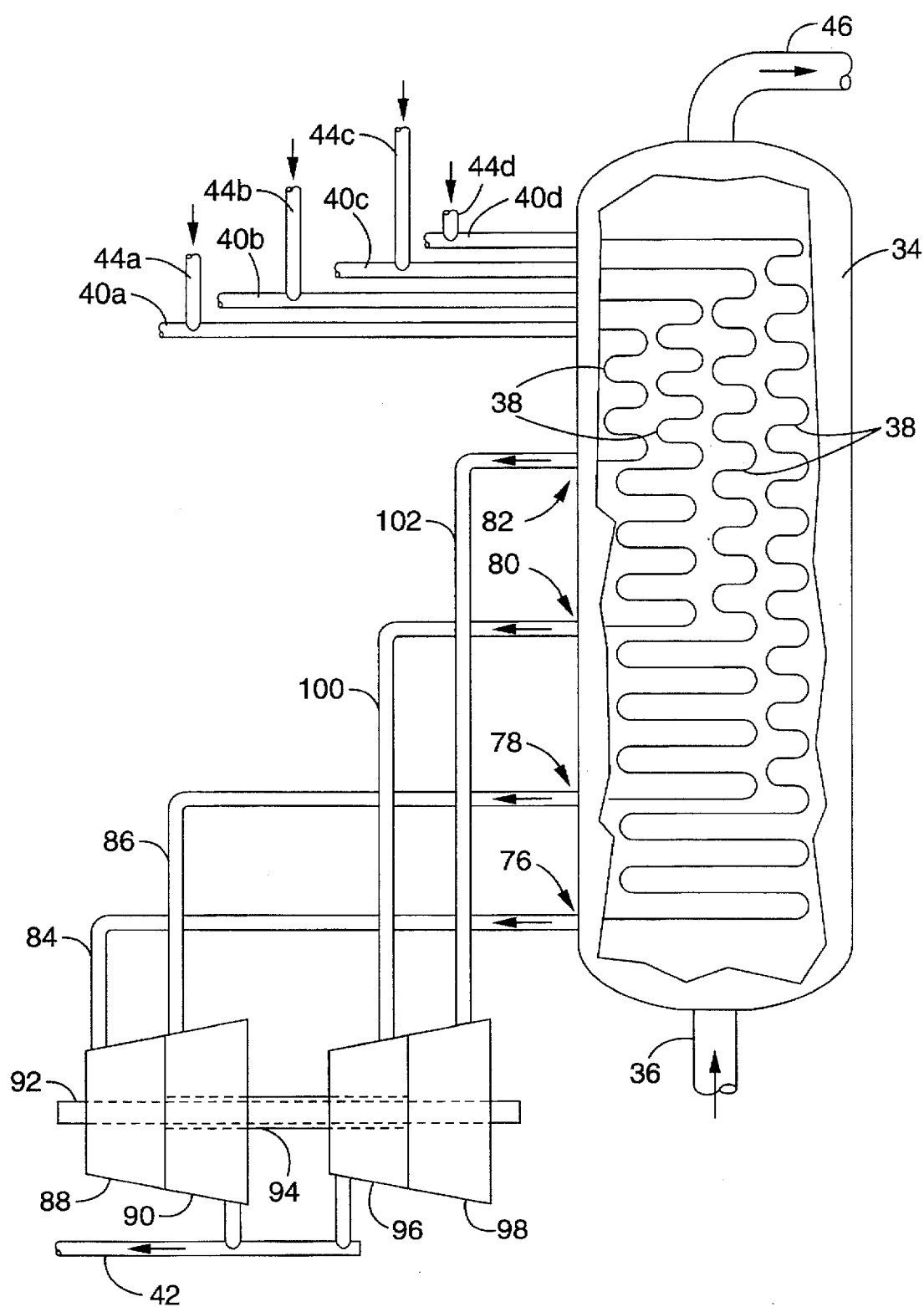
FIG. 3 is a schematic diagram of the heat exchanger portion of the powerplant shown in FIG. 1 configured for steam raising and pressure equalization.

Referring now to FIG. 3, in all embodiments in which the heat exchanger 34 serves only as a heat exchanger (including serving as a reformer feed preheat exchanger), the heat exchanger ideally has two requirements to meet: (1) it must reduce the compressed air temperature to the lowest practical level, and (2) it must produce as much steam/fuel mixture as possible at a pressure which is sufficient to enter combustor 48 (e.g., approximately 50 to 100 psia greater than the pressure in the combustor). Enhancing the performance of heat exchanger 34 so that the air temperature can be lowered to the lowest practical level can be accomplished by generating steam at multiple pressures.

In order to generate steam at multiple pressures, the water and fuel are injected into the heat exchanger at multiple pressures. In the case of a lower pressure mixture, the water will boil at a lower temperature than in the case of a higher pressure mixture and, therefore, steam will be raised in a different portion (lower temperature portion) of the heat exchanger than for the higher pressure mixture (higher temperature portion). When the temperature of the steam raised reaches the "pinch point", that is, when the temperature of the steam/fuel mixture closely approaches the temperature of the gas flowing through the heat exchanger at a particular point, the heat transfer has been maximized and the mixture is removed from the heat exchanger.

However, in this instance, we have use for only one pressure of steam/fuel mixture—that pressure which will allow entry to the combustor 48—and we wish to convert all of the heat extracted from the air side to steam at the required pressure. To allow the extraction of steam/fuel at multiple pressures while still meeting the need for injecting steam/fuel into the combustor 48 at a the required pressure, a pressure equalizing means can be employed.

In accordance with the invention, heat exchanger 34 will typically include a plurality of parallel coil sections as shown in FIG. 3. If, for example, the steam/fuel mixture is removed at four points 76, 78, 80 and 82 in the heat exchanger, there will be four coils and four corresponding input pressure levels, two in excess of required pressure and two below the required pressure. The fuel 40a, 40b, 40c, 40d and water 44a, 44b, 44c, 44d inlets correspond to the lowest to highest pressure inputs to the coils in the heat exchanger.

The two highest pressure steam/fuel flows 84, 86 can be routed through steam turbines 88, 90, respectively, which are connected by shafts 92, 94 to steam compressors 96, 98 into which the two lower pressure steam/fuel mixture flows 100, 102 are routed. The higher pressure steam/fuel mixtures will drive the turbines and compressors, thereby resulting in a pressure reduction. In ram, the compressors will compress the lower pressure steam/fuel mixtures, thereby resulting in a pressure increase. Note that the configuration of FIG. 3 uses two concentric shafts rotating at two different speeds, which is more efficient than using a single shaft at one speed.

The outputs of the compressors and turbines are combined so that the steam/fuel mixtures exhausted from the compressors and the turbines through steam/fuel outlet 42 will be one combined flow at the single required pressure. As can be seen, therefore, the compressors and turbines operate as means for expanding lower pressures, lowering higher pressures, and equalizing the pressure in the steam/fuel mixture. In addition, the amount of steam in the steam/fuel mixture will be increased.

It will be appreciated that a single pressure product steam could be achieved where the fuel product is removed at three pressures; a high pressure and an intermediate pressure which are above the desired pressure, and a low pressure which is below the desired pressure. In that situation, the high and intermediate pressure flows could be used to drive the turbine, and the low pressure flow would be boosted by the compressor. The combined output flow would then be at a desired intermediate pressure. It is also possible to configure the heat exchanger for flows at two pressures or more than four pressures without departing from the invention.

Figure 4:
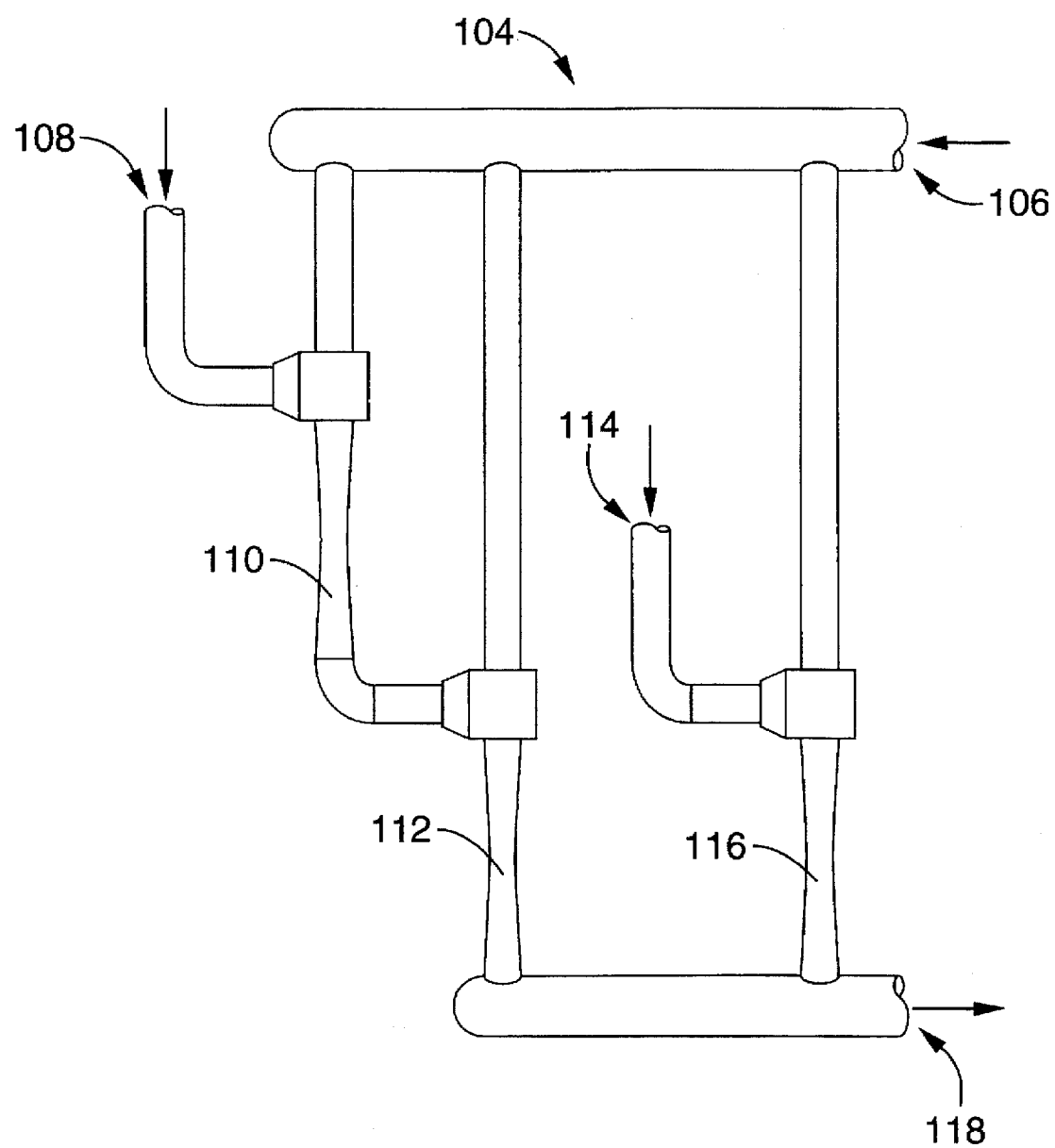
FIG. 4 is a schematic diagram of an alternative embodiment of the steam raising and pressure equalization apparatus shown in FIG. 3.

Referring now to FIG. 4, a desired single pressure product can also be achieved, albeit less efficiently, by the use of a single steam jet ejector or multiple steam jet ejectors configured as a steam reclaiming thermocompressor array 104. In this configuration, which uses three pressure levels by way of example, and not of limitation, the compression is achieved without any moving parts but requires a higher ratio of high pressure to low pressure steam. For example, a high pressure flow would enter thermocompressor array 104 at inlet 106 to boost both a low pressure flow entering at inlet 108. The two flows would mix in a first stage ejector 110, and exit ejector 110 at an intermediate pressure. This intermediate pressure flow and the original high pressure flow would then mix in a second stage ejector 112, and exit ejector 112 at the target intermediate pressure.

An intermediate pressure flow (between the low pressure flow and the high pressure flow) would enter at inlet 114, mix with the high pressure flow in ejector 116, and exit ejector 116 at the target intermediate pressure. The two output flows from ejectors 112 and 116 would then combine to form the desired common intermediate pressure flow at outlet 118 which can then be routed to the combustor.

It will be appreciated that, while a multiple thermocompressor array has been shown in FIG. 4, a single steam jet ejector may be used to equalize multiple pressures if desired.

Also, by employing the invention, performance of steam injected gas turbine cycles can be enhanced whether a two-phased feed of water and combustible is used as described above, or whether steam is raised without taking advantage of the thermodynamic benefits of the two-phased feed by injecting water only into the heat exchanger at multiple pressures wherein the heat becomes a multiple pressure once-through boiler.

It will be further appreciated that the configurations shown in FIG. 3 and FIG. 4 are equally applicable to equalization of pressures in a heat exchanger which is positioned directly downstream of the high pressure compressor as shown in FIG. 1, positioned in the exhaust stack as shown in FIG. 2, or positioned elsewhere in the powerplant. Additionally, where the invention is employed in the exhaust stack, the resultant intermediate pressure steam/fuel mixture can be routed through a coil in the exhaust stack so the highest temperature exhaust heat can be used to superheat the steam/fuel mixture for delivery to an autothermal reformer prior to being fed into the combustor.

Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A steam raising heat exchanging apparatus, comprising:
   (a) a hot-gas-to-fuel heat exchanger, said heat exchanger including a hot gas inlet and a cool gas outlet, said heat exchanger including a plurality of coil means for receiving fuel and water, said heat exchanger including means for producing multiple pressure steam/fuel mixtures;
   (b) pressure increasing means for increasing the pressure of low pressure steam/fuel mixtures produced by said heat exchanger, said pressure increasing means including a steam/fuel inlet coupled to said heat exchanger, said pressure increasing means including a steam/fuel outlet; and
   (c) pressure reducing means for reducing the pressure of high pressure steam/fuel mixture produced by said heat exchanger, said pressure reducing means including a steam/fuel inlet coupled to said heat exchanger, said pressure reducing means including a steam/fuel outlet coupled to said steam/fuel outlet of said pressure increasing means.

2. An apparatus as recited in claim 1, wherein said pressure reducing means comprises a steam turbine, and wherein said pressure increasing means comprises a compressor, said compressor coupled to said turbine by a shaft.

3. An apparatus as recited in claim 1, wherein said pressure increasing means and said pressure reducing means comprise a steam jet ejector.

4. A steam raising heat exchanger, comprising:
   a hot-gas-to-fuel heat exchanger, said heat exchanger including a hot gas inlet and a cool gas outlet, said heat exchanger including a plurality of coil means for receiving fuel and water, said heat exchanger including means for producing steam/fuel mixtures;
   (b) a steam turbine, said steam turbine including a steam/fuel inlet coupled to said heat exchanger, said steam turbine including a steam/fuel outlet; and
   (c) a compressor, said compressor including a steam/fuel inlet coupled to said heat exchanger, said compressor including a steam/fuel outlet coupled to said steam/fuel outlet of said steam turbine, said compressor coupled to said turbine by a shaft.

5. A steam raising heat exchanger as recited in claim 4, wherein said coil means carry a fuel/water mixture at varied pressures, wherein said turbine exhausts a steam/fuel mixture at a pressure lower than the steam/fuel mixture input into said turbine, wherein said compressor exhausts a steam/fuel mixture at a pressure higher than the steam/fuel mixture input into said compressor, and wherein the steam/fuel mixtures exhausted by said turbine and said compressor mix to form a single pressure steam/fuel mixture.

* * * * *